(12) United States Patent
Yan et al.

(10) Patent No.: US 8,345,191 B2
(45) Date of Patent: Jan. 1, 2013

(54) LIQUID CRYSTAL DISPLAY DEVICE HAVING OPTICAL COMPONENT FOR CHANGING STATE OF POLARIZED LIGHT

(75) Inventors: Xiaolin Yan, Guangdong (CN); Dong Fu, Guangdong (CN); Xiangwei Xie, Guangdong (CN); Xianwen Sun, Guangdong (CN); Hong Zhang, Guangdong (CN); Weidong Huang, Guangdong (CN)

(73) Assignee: TCL Corporation, Guangdong (CN)

( * ) Notice: Subject to any disclaimer, the term of this patent is extended or adjusted under 35 U.S.C. 154(b) by 1230 days.

(21) Appl. No.: 12/003,649

(22) Filed: Dec. 28, 2007

(65) Prior Publication Data

US 2008/0309855 A1 Dec. 18, 2008

(30) Foreign Application Priority Data

Feb. 6, 2007 (CN) .......................... 2007 1 0073222
Mar. 23, 2007 (CN) .......................... 2007 1 0073652

(51) Int. Cl.
*G02F 1/1336* (2006.01)
(52) U.S. Cl. .......................................... 349/98; 349/119
(58) Field of Classification Search .................. None
See application file for complete search history.

(56) References Cited

U.S. PATENT DOCUMENTS

| 4,398,805 A * | 8/1983 | Cole ................................. 349/68 |
| 6,295,109 B1 * | 9/2001 | Kubo et al. .................... 349/119 |
| 7,417,700 B2 * | 8/2008 | Jang et al. ...................... 349/114 |
| 2002/0159006 A1 * | 10/2002 | Miyatake et al. ................ 349/98 |
| 2003/0090619 A1 * | 5/2003 | Kumagai et al. ............... 349/194 |
| 2008/0018833 A1 * | 1/2008 | Ma .................................... 349/98 |
| 2009/0079912 A1 * | 3/2009 | Asao ................................ 349/98 |

\* cited by examiner

*Primary Examiner* — Thanh-Nhan P Nguyen
(74) *Attorney, Agent, or Firm* — Morgan, Lewis & Bockius LLP

(57) ABSTRACT

An optical component capable of changing polarization light state and a liquid crystal display (LCD) device using the same are provided. The optical component including a transparent substrate and a wavelength compensator is disposed at any position from the outer side of the LCD device to the outside in an output direction of an output light. The wavelength compensator is directly attached to the surface of the substrate to convert an output light of the LCD device from a linearly polarized light into a circularly polarized light or an elliptically polarized light, thereby effectively reducing eye fatigue. The LCD device is provided with such an optical component such that a linearly polarized light emerging from the LCD device is converted into a circularly polarized light or an elliptically polarized light to lessen the eye fatigue.

23 Claims, 8 Drawing Sheets

LIQUID CRYSTAL DISPLAY DEVICE HAVING OPTICAL COMPONENT FOR CHANGING STATE OF POLARIZED LIGHT

This application claims the benefit of Chinese Patent Application No. 200710073222.6 filed in China on Feb. 6, 2007 and Chinese Patent Application No. 200710073652.8 filed in China on Mar. 23, 2007, which are hereby incorporated by reference.

BACKGROUND OF THE INVENTION

1. Field of the Invention

The present invention relates to a liquid crystal display (LCD) device, and more particularly, to an LCD device including an optical component for changing the polarization state of light emitted from the LCD device.

2. Discussion of the Related Art

LCD devices have become the ubiquitous human/device interface. This is particularly true in electronic devices such as mobile phones, game devices, electronic dictionaries, video cameras, digital cameras, and MP3 players. LCD devices are also used as computer monitors and in notebook computers. LCD TVs using LCD devices are very popular and are available in large sizes. Thus, humans spend many hours each day viewing text and video images on LCD devices.

Referring to FIGS. 1A and 1B, an LCD includes two glass substrates having transparent electrodes 102, 104. The glass substrates are spaced by glass beads or plastic beads with a diameter of several microns, and the edges thereof are sealed with an adhesive. Twisted nematic liquid crystals 130 may be injected and twisted by 90° between the upper and lower substrates 104, 102. Two light polarizers 120, 110 having mutually perpendicular optical axes are respectively attached to the outer surfaces of the upper and lower substrates 104, 102. The optical axis (in parallel with the paper plane) of the upper polarizer 120 is parallel to the orientation of the liquid crystals at the upper substrate 104, and the optical axis of the lower polarizer 110 (perpendicular to the paper plane) is parallel to the orientation of the liquid crystals at the lower substrate 102. Natural light, e.g., from a light source not shown, is incident into a liquid crystal screen in a direction from the upper substrate 104 to the lower substrate 102. When no electrical field is applied (FIG. 1A), the light passes through the first polarizer 120 to become light polarized in parallel with the orientation of the liquid crystals at the upper substrate 104. The polarized light is then rotated 90° by the liquid crystal layer to be parallel to the optical axis of the polarizer 110 at the lower substrate 102 so as to pass through the polarizer. This is referred to as the bright state of the display.

As shown in FIG. 1B, when an electrical field is applied, the liquid crystal molecules 130 are rotated to align themselves in a direction of the electrical field, and the originally twisted orientation turns into a vertically parallel orientation. The polarized light does not interact with the vertically aligned liquid crystals, and the polarization plane will not be rotated when the polarized light emitted from the upper polarizer 120 passes through the liquid crystal layer. When the polarized light reaches the polarizer 110 at the output end, the polarization axis of the polarizer is perpendicular to the polarization direction of the output light. Light is blocked from being emitted from the polarizer 110 in what is called the dark state of the LCD device. If the electrical field is not strong enough to reorient the liquid crystals completely, the liquid crystal molecules will be oriented with an angle of inclination and the light rotation effect will occur to some degree. A portion of the light will pass through to exhibit an intermediate grayscale.

The above describes the operation principle of an LCD device. It is known from the operation principle of the LCD device that the output light will be linearly polarized. Also, in addition to the twisted nematic liquid crystals, the liquid crystal material will have some distortion characteristics such as extension and bending, and the different distortion characteristics correspond to different display modes of the LCD device. However, the basic principles of these display modes are similar to that of the twisted nematic liquid crystals, i.e., changing polarization directions of the light to display light patterns through different orientations of the liquid crystal molecules. Therefore, the final output light is a linearly polarized light.

Unlike linearly polarized light, natural light has a uniform vector distribution in all directions. The stimulation of the uniformly distributed natural light on photoreceptor cells in human eyes is isotropic, and human eyes are more accustomed to natural light. Circularly polarized light is also a kind of polarized light, however, the vector directions of circularly polarized light are rotating rapidly, and so circularly polarized light also exhibits characteristics of isotropism like natural light. Compared with linearly polarized light, human eyes feel more comfortable receiving and viewing circularly polarized light.

Over the past decade, with the rapid development of information technology and the great increase in human-computer interaction, there have been increasing complaints of eye fatigue and other eye irritations. There also have been reports relevant to this issue establishing that the eye fatigue phenomenon is especially prevalent among people who spend long hours using computers or watching LCD TVs.

LCD display technology has been identified as a cause of eye fatigue in part because of the relatively high average brightness of the LCD devices such as TVs, and the blurriness of rapidly moving images on LCD TVs. Also, since the light emitted from LCD TVs is linearly polarized, it contributes to eye fatigue and irritation. Therefore, it is of great significance to change the polarization state of the output light of conventional LCD devices from being linearly polarized to being circularly polarized similar to natural light to alleviate eye fatigue and irritation of the viewers.

SUMMARY OF THE INVENTION

Accordingly, the present invention is directed to an LCD device and an optical component used in an LCD device which substantially obviate one or more of the problems due to limitations and disadvantages of the related art.

An object of the present invention is an LCD device having an optical component for changing the polarization state of the output light to reduce eye fatigue and irritation for viewers of the device using natural eyesight, i.e., without polarizing spectacles.

Another object of the present invention is an optical component which when used in combination with an LCD device causes light passing through the optical component to become circularly polarized or elliptically polarized for viewing with natural eyesight.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, a liquid crystal display (LCD) device having reduced eye fatigue for viewers viewing the device with natural vision, comprises a transmitting element having an outer surface for emitting substantially linearly polarized output light, a polarizer component receiving and converting linearly polarized light into light that is substantially circularly or elliptically polarized light for output to a viewer of the display to decrease eye fatigue thereof when viewed with natural vision.

A further aspect of the present invention is an optical component to be disposed on a liquid crystal display (LCD) device to change the polarization of output light emitted from the LCD device to reduce eye fatigue of a person viewing the device with natural vision, the optical component comprising, a transparent substrate; and a wavelength compensator on a surface of the substrate, wherein the wavelength compensator converts an output light of the LCD device from a substantially linearly polarized light into a substantially circularly or elliptically polarized light, thereby attenuating eye fatigue to viewers of images on the LCD with natural vision.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings.

DESCRIPTION OF EMBODIMENTS

Referring to FIGS. 2 to 5, an LCD device capable of changing the polarization state of output light according to the first embodiment of the present invention is shown. As used herein, natural vision means viewing without glasses having polarizing changing properties. A λ/4 compensation film 16 is attached on the output light polarizer 110. The compensation film 16 is an optical thin film capable of providing a wavelength phase delay function, for light preferably for wavelengths λ in a range of 380 nm to 760 nm. The compensation film 16 has an optical retardation value of 140 mm, and is adhered with an adhesive 14 on the output light polarizer 110. A protective film 18 may be provided on the exterior surface (output side) of the compensation film 16. The compensation film 16 is preferably, directly adhered to the output light polarizer 110 without using additional components to maintain the cost low.

An absorption axis of the polarized light emerging from the output light polarizer 110 is at an angle of 45° from a retardation optical axis of the compensation film 16. As the wavelength delay of the compensation film 16 is λ/4, linearly polarized light emerging from the output light polarizer 110 may be converted into circularly polarized light. The above conclusion is based on the following principle.

Figure 6:
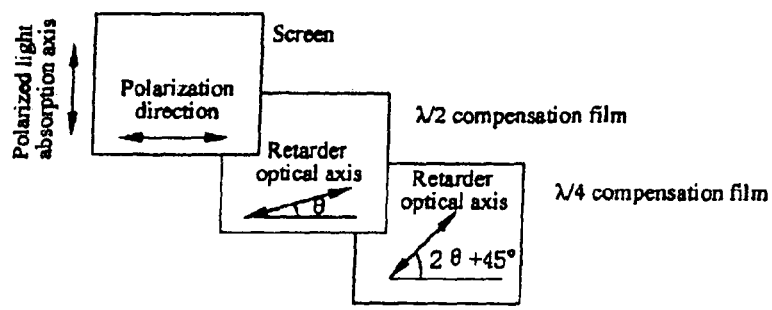
FIG. 6 is a schematic optical view of the LCD screen of FIGS. 2 and 5.

Assuming that the linearly polarized light incident on the wavelength retardation element (i.e., the compensation film 16) has a certain vibration plane (as shown in FIG. 6), then electrical vectors of the vibration plane in the X-axis and Y-axis can be expressed by the equations below:

$$\begin{cases} E_x = a_x \cos(\omega t + \varphi_x) \\ E_y = a_y \cos(\omega t + \varphi_y) \end{cases} \quad (1\text{-}1)$$

where A is the amplitude of the incident light ω is the angular frequency. φ is the phase angle, and λ is the wavelength of the light. And:

$$a_x = A \cos \alpha$$

$$a_y = A \sin \alpha \quad (1\text{-}2)$$

Let:

$$\tau = \omega t \quad (1\text{-}3)$$

then Equation (1-1) becomes:

$$\begin{cases} \dfrac{E_x}{a_x} = \cos\tau\cos\varphi_x - \sin\tau\sin\varphi_x \\ \dfrac{E_y}{a_y} = \cos\tau\cos\varphi_y - \sin\tau\sin\varphi_y \end{cases} \quad (1\text{-}4)$$

Let:

$$\delta = \varphi_y - \varphi_x \quad (1\text{-}5)$$

where δ is the phase difference between X-axis and Y-axis components of the incident light; then:

$$\begin{cases} \dfrac{E_x}{a_x}\sin\varphi_y - \dfrac{E_y}{a_y}\sin\varphi_x = \cos\tau\sin\delta \\ \dfrac{E_x}{a_x}\cos\varphi_y - \dfrac{E_y}{a_y}\cos\varphi_x = \sin\tau\sin\delta \end{cases} \quad (1\text{-}6)$$

Square both sides of Equation (1-6) and summarize the resulting amounts, then:

$$\left(\dfrac{E_x}{a_x}\right)^2 + \left(\dfrac{E_y}{a_y}\right)^2 - \dfrac{2E_xE_y}{a_xa_y}\cos\delta = \sin^2\delta \quad (1\text{-}7)$$

According to a locus equation obtained from the combination of vertical vibration composition Equation (1-7), if the phase difference $\delta=\pm\pi/2$, a locus equation of Equation (1-8) is obtained:

$$\left(\dfrac{E_x}{a_x}\right)^2 + \left(\dfrac{E_y}{a_y}\right)^2 = 1 \quad (1\text{-}8)$$

If $a_x=a_y$, Equation (1-8) becomes an equation of a circle. Therefore, when a linearly polarized light beam is incident on a wave plate with a thickness of d, the conditions that the output light is circularly polarized are as follows.

1) The phase difference between $E_x$ and $E_y$ is:

$$\delta = \pm\dfrac{\pi}{2},$$

in which as $$\delta = \dfrac{2\pi}{\lambda}(n_y - n_x)d$$

is induced by the wave plate itself, a λ/4 retardation is adopted.

2) Amplitudes of $E_x$ and $E_y$ are: $a_x=a_y$, in which assuming the amplitude of the polarized incident light is A, and the included angle between the vibration direction of the polarized incident light and the X-axis is α, then $a_x$=A cos α and $a_y$=A sin α. To make $a_x=a_y$, α must be 45°.

To sum up, in order to obtain circularly polarized light beam, linearly polarized light beam is passed through a wavelength retardation element having an odd multiple of λ/4 wavelength, where the optical axis of the wavelength retardation element has an odd multiple of λ/4 wavelength and is at an angle of 45° from the polarization direction of the light incident upon the retardation element.

Therefore, in the LCD device having a polarizing element according to the first embodiment of the present invention, a quarter wavelength (λ/4) compensation film 16 is adhered to the output light polarizer 110, and the compensation film 16 is at an angle of 45° from the incident light, thus obtaining circularly polarized light.

Figure 4:
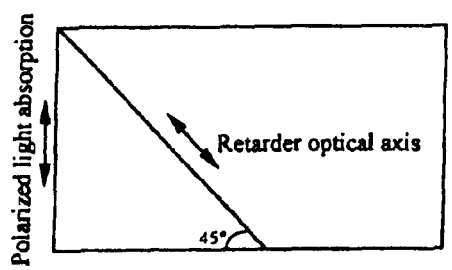
FIG. 4 is a schematic view of the angle between a retardation optical axis of a compensator and an optical axis of a polarizer.
Figure 5:
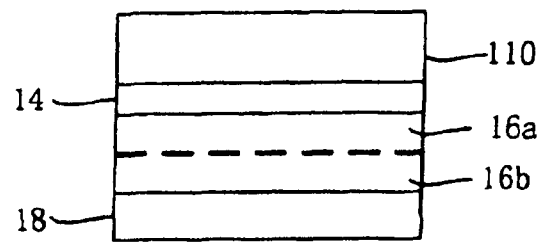
FIG. 5 is a schematic view of an LCD device according to a second embodiment of the present invention.

Referring to FIGS. 5 and 4 together, an LCD device having a polarizing element according to a second embodiment of the present invention is shown. In this embodiment, a composite film 16 with a λ/4 compensation function is disposed on the output light polarizer 110, and consists of a half wavelength (λ2) compensation film 16a and a λ/4 compensation film 16b arranged along the output light direction. The output light wavelength may be in a range of 380 nm to 760 nm. The polarization direction of the output light is at an angle of θ from the delay axis of the λ/2 compensation film, and the retardation optical axis of the λ/4 compensation film is at an angle of 2θ+45° or 2θ+135° from the polarization direction of the output or incident light, where θ varies in a range of 0° to 90°.

A protective film 18 is provided, e.g., adhered, on the λ/4 compensation film 16b. Preferably, the thicknesses of the λ/4 compensation film 16b and the λ/2 compensation film 16a are respectively 140 nm and 270 nm. Thus, the output light of the LCD may be converted from linearly polarized light into circularly polarized light or elliptically polarized light.

Referring to FIGS. 5 and 4 again, the polarization direction of the output polarized light emerging from the LCD device is at an angle of θ from the retardation optical axis of the λ/2 compensation film 16a (λ/2 retardation film). The retardation optical axis of the λ/2 compensation film 16a is at an angle of 2θ+45° from the optical axis of the λ/4 compensation film 16b (λ/4 retardation element). Compared with the LCD device of the first embodiment, the LCD device of the second embodiment adopts the composite film consisting of the λ/2 compensation film 16a and the λ/4 compensation film 16b, i.e., a combination of wavelength retardation elements, so as to achieve a better compensation to the visible light wavelength.

The optical component of the present invention may be added to convert an output light of the LCD device from linearly polarized light into circularly or elliptically polarized light. The optical component may be installed at any position from the outer side (light receiving surface) of the LCD device to the light emitting surface along the output direction of the output light. The optical component includes a transparent substrate and a wavelength compensation film, which is closely attached to the surface of the substrate and capable of converting an output light of the LCD device into circularly polarized light or elliptically polarized light.

Figure 8:
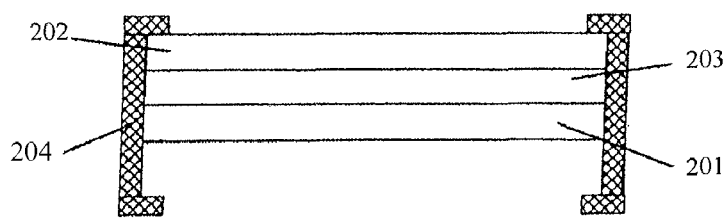
FIG. 8 is a schematic structural view of an optical component according to the first preferred embodiment of the present invention.
Figure 9:
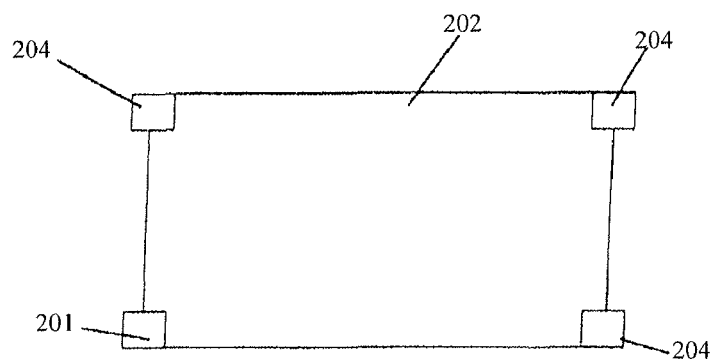
FIG. 9 is a schematic top view of FIG. 8.

Referring to FIGS. 8, 9 and 4, which illustrate the optical component according to the first preferred embodiment of the present invention, the optical component is disposed at any position from an outer side of a display screen of an LCD device (such as an LCD or LCD TV) to the outside along an output direction of an output light. The optical component has two transparent glass substrates 201, 202 and a wavelength compensator 203. The wavelength compensator 203 is an optical thin film, which is an odd-multiple λ/4 compensation film and is capable of providing a wavelength phase retarding function. The wavelength λ of the wavelength compensator 203 is preferably in a range of 380 nm to 760 nm with an optical retardation value of 140 nm. The wavelength compensator 203 may be adhered by adhesive on the substrate 201 or cover the substrate 201 by means of coating, for example. The other substrate 202 is attached onto the surface of the wavelength compensator 203 for providing additional protection. In addition, a protective film made of a material such as PVC may be used as the substrate 202, and the protective film may be directly attached onto the wavelength compensator 203. It is would be understandable that the material of the substrates 201, 202 in the optical component is but not limited to glass, as long as the output of the light will not be affected.

Figure 10A:
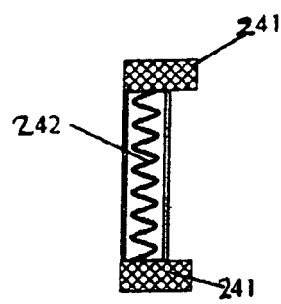
FIG. 10a is a schematic view of a clamp in FIG. 8.
Figure 10B:
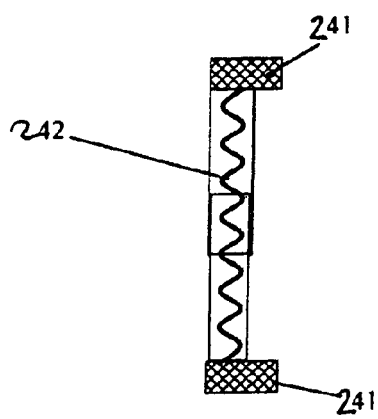
FIG. 10b is a schematic view illustrating the clamp of FIG. 10a in a working state.

For the convenience of mounting the optical component on the LCD device, the present invention further provides clamps 204 to symmetrically clamp the optical component and the LCD device. As shown in FIGS. 10a and 10b, in this embodiment, the clamp 204 has two clamping heads 241, which are connected via an elastic element 242 (such as a spring), such that the distance between the two clamping heads 241 may be adjusted according to the thickness of an object to be clamped. The clamped object is clamped through the elastic restoring force of the elastic element 242.

Figure 11:
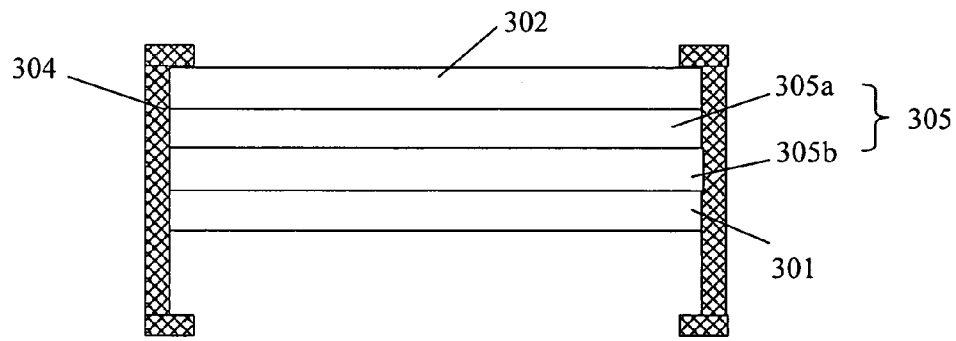
FIG. 11 is a schematic structural view of an optical component according to the second preferred embodiment of the present invention.

Referring to FIGS. 11 and 4 together, an optical component according to the second preferred embodiment of the present invention is shown. Different from the first preferred embodiment, the second preferred embodiment provides a composite film 305 with a λ/4 compensation function disposed on the substrate 301. The composite film 305 consists of a λ/2 compensation film 305a and a λ/4 compensation film 305b arranged along an output light direction, in which the λ/2 compensation film 305a is sandwiched adhesively between the λ/4 compensation film 305b and the substrate or the protective film 302. Such an optical component with a wavelength in a range of 380 nm to 760 nm may also be clamped on the LCD device by means of the clamp 304. The polarization direction of the output light is at an angle of θ from the retardation optical axis of the λ/2 compensation film 305a, and the retardation optical axis of the λ/4 compensation film 5b is at an angle of 2θ+45° or 2θ+135° from the polarization direction of the output or incident light, where θ varies in a range of 0° to 90°.

Figure 1A:
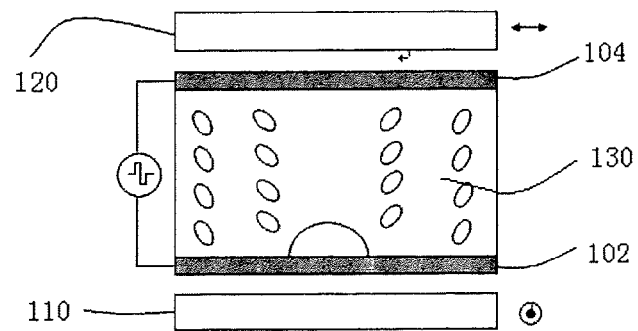
FIGS. 1A and 1B are schematic structural views of an LCD device of the related art.
Figure 1B:
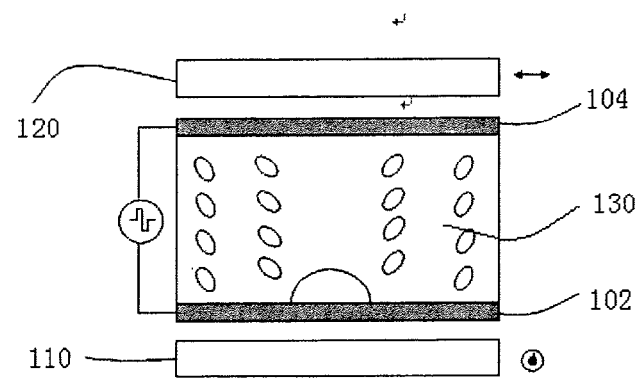
Figure 3:
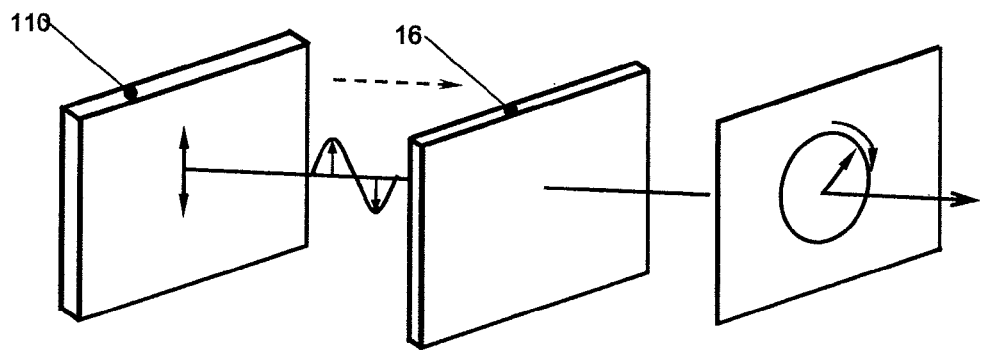
FIG. 3 is a schematic optical view of the conversion of linearly polarized light to circularly polarized light.
Figure 2:
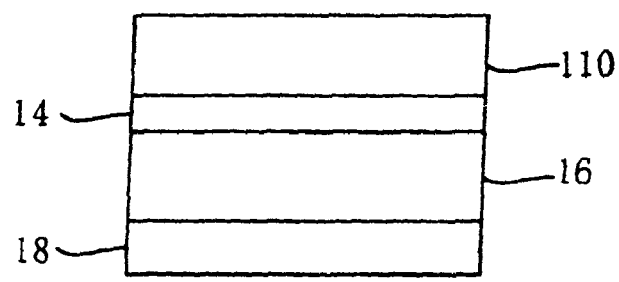
FIG. 2 is a sectional view of an LCD device according to a first embodiment of the present invention.

Preferably, the thicknesses of the λ/4 compensation film 5b and the λ/2 compensation film 5a are respectively 140 nm and 270 nm, so as to convert the output light of the LCD device from linearly polarized light into circularly or elliptically polarized light (see FIG. 3).

Referring to FIG. 6 again, there is an included angle θ between the polarization direction of the output polarized light emerging from the LCD device and the retardation optical axis of the λ/2 compensation film 305a, and an included angle 2θ+45° between the retardation optical axis of the λ/2 compensation film 305a and the optical axis of the λ/4 compensation film 305b. The second preferred embodiment of the present invention adopts the composite film consisting of the λ/2 compensation film 305a and the λ/4 compensation film 305b, i.e., a combination of wavelength retardation films, so to achieve better compensation for the wavelength range of visible light.

The two embodiments of the present invention have been tested. In the experiment, a 32-inch LCD TV was used. Viewers watched DVD programs for 180 minutes continuously on a conventional LCD TV, an LCD TV with a ¼ wavelength retardation film, and an LCD TV with a composite retardation element consisting of a ½ wave plate and a ¼ wave plate. A survey of subjective symptoms associated with the eye fatigue and vision was carried out every 30 minutes. The maximum brightness of the TV was set to 325 cd/m$^2$ in all cases. In all cases, the viewing environment was set to a normal illumination level for home lighting, i.e., 90 lux to 100 lux, and the viewers sat at a distance of about 2.2 m from the screen. The sample viewers were divided into four groups including a children group with test subjects between the ages of 8 and 18, a young adult group with test subjects between the ages of 19 and 35, a middle aged group with test subjects between the ages of 36 and 55, and an elderly group whose ages were above 55. Ten viewers were selected for each group, i.e., 40 viewers participated in the comparative experiment overall.

Figure 7:
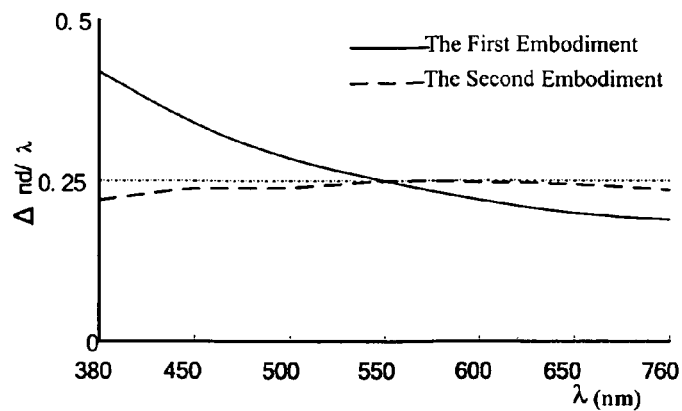
FIG. 7 is a schematic view showing the comparison of optical characteristics of the LCD screens of the first and second embodiments.

The experiment results summarized in FIG. 7 show that in the cases of the traditional LCD TV and LCD TVs respectively installed with the optical component of the first and second preferred embodiments, the vision of the viewers attenuated to some degrees along with the time spent watching the DVD programs. Comparatively, after a half-hour, the vision of the viewers became transiently obscured in all three cases. When the optical components of the first and second preferred embodiments were used, the viewers experienced less deterioration of vision than those watching the traditional LCD TV. Moreover, viewers watching the LCD TV having the optical component of the second preferred embodiment experienced even a lower level of deterioration of vision than those watching the LCD TV with the optical component of the first preferred embodiment.

The eye fatigue caused by watching TV for a long time belongs to one symptom of Video Display Terminal (VDT) syndrome, which is mainly represented by dry eyes, eye swelling, ophthalmalgia, blurred vision, etc. It is commonly understood that the underlying reasons for eye fatigue when watching and LCD lies in that, when focusing on the screen, people blink less unconsciously (nictitation diminution). As a result, the cornea is exposed to the open air for a prolonged time which affects negatively the dispersion of lipid in the tears to lead to the malnutrition of the corneal epithelium and the deterioration of the quality of the tear film, a raised temperature on the surface of the cornea, and hence dry eye, foreign body sensation, and ophthalmalgia.

The eye fatigue phenomenon may be researched from two aspects, namely, psychology and physiology. The common means includes evaluation of the subjective feeling about eye fatigue such as eye swelling, dry eye, etc, observation of changes in the graded vision, and observation of the changes in contrast sensitivity. Objective examination includes observation of changes in blinking frequency; filter paper test for observing changes in the tear secretion; observation of the changes in the breaking time of tear film, etc.

Among the above factors, blinking frequency may be objectively recorded through a vision electrophysiological manner, which is a sensitive index capable of reflecting the eye fatigue severity and of being online detected in real time. Experiment I was performed by recording changes in graded vision, and Experiment II was performed by recording the changes in blinking frequency.

Experiment I was directed to the same examinees, who respectively watch a common LCD-TV emitting linearly polarized light to the natural eyesight of the viewer (L-type machine) and an LCD-TV of the present invention emitting circularly-polarized light to the natural eyesight of the viewer (C-type machine) at different times, so as to obtain changes in vision during the watching, and thus reflect changes of the eye fatigue. The model of the LCD-TV is an LCD32K73. Both of TV sets were calibrated by a spectrophotometer so as to make their optical parameters consistent; and the sources of the display signals were BBK DVD-DV985s.

In this experiment, we used an "E" symbol-type graded vision table with the minimum vision grade as 0.01. In Experiment I, we simulated the circumstance of watching TV at home, and organized the examinees to watch TV for 2.5 hours in a testing environment according to Table 1.

When selecting the examinees, the examinees confirmed that they had not watched the program before. Each time when they watched the program, their vision was measured every 30 minutes, and the change in vision was recorded. Considering differences among the examinees to be adapted for the environment, the test of the primary graded vision begins from the 10$^{th}$ minute, so as to eliminate such differences.

TABLE 1

Testing Environment

| Watching Condition | Settings |
|---|---|
| Size of Screen | 32" (1366 × 768) |
| Distance from the TV | ~2.5 m |
| Watching | 90° ± 15° |
| Brightness at Peak | 430 ± 10 cd/m$^2$ |
| Contrast | 500:1 |
| Environmental Luminance | 40 ± 10 Lux |

The sample machine and the testing environment in Experiment II were the same as that in the Experiment I. In Experiment II, in order to avoid interrupting the continuity of the watching process and to objectively reflect the actual situation, the electrophysiological signals of human eyes were recoded with an electrooculogram (EOG), so as to obtain the blinking frequency. The EOG recording instrument used was a Neuropack-II available from Hamamatsu Photonics of Japan. The electrodes employed were Ag/AgCl with a recording electrode attached right below the left lower face, a reference electrode attached at the center of the forehead, and a ground electrode attached at the left earlobe.

The examinees were classified into two groups, who respectively watched the L-type sample machines and the C-type sample machines. The examinees may be attracted by the content of the program to reduce their blinking frequencies unconsciously. We recorded the number of blinks before watching the film and after. Meanwhile, in order to prevent the examinees from being influenced by the physiological factors and to maintain TV watching continuously, a 7-minute scenery program without a plot was played during the EOG recordation both before the film started and after the film ended. The EOG recording time was 400 s for each section. In order to analyze the changes of the blinking frequency when the examinees were watching the story program, the EOG records were conducted three times during the whole process, which were at time points of 60 min, 90 min, and 120 min after the film began.

Figure 12:
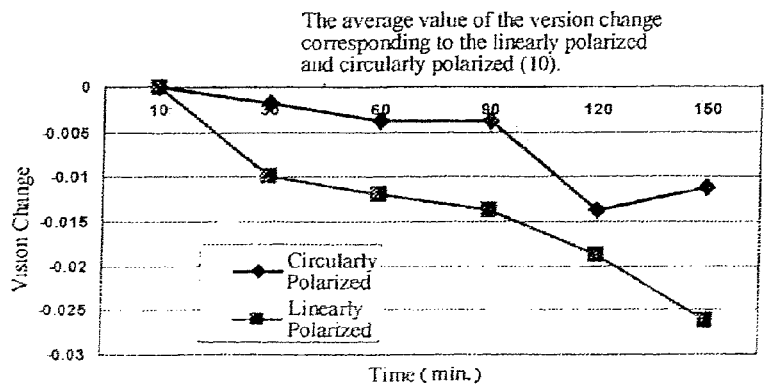
FIG. 12 is a graph illustrating experimental results of persons watching LCD televisions.

In Experiment I, 32 normal persons were selected for watching the LCD-TV twice, namely, watching the L-type sample machine once and watching the C-type sample machine once to provide 64 sets of data. Statistically, there were no significant differences between the two groups in terms of gender or age. The changing data for the average values of the graded visions of the two groups of examinees during the watching experiments is drawn in the graph shown in FIG. 12.

As can be seen from the graph, for both sets of data vision gradually dropped over time, but the circularly-polarized group dropped less than the linearly-polarized group. At 150 minutes, the graded vision for the examinees in the circularly-polarized group gradually increased because after some examinees suffered serious eye fatigue at the time section of 120 minute, they become less concentrated on the TV program or closed their eyes for a short period of rest for the reason of self protection.

Figure 13A:
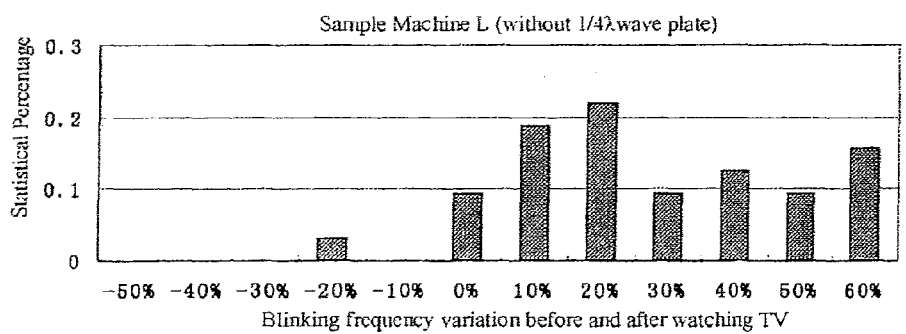
FIG. 13A is a graph illustrating blinking rate of TV viewers of L-type machine.
Figure 13B:
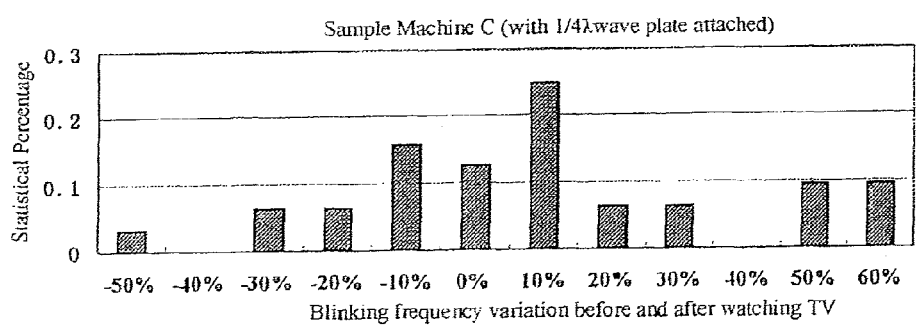
FIG. 13B is a graph illustrating blinking rate of TV viewers of C-type machine.

In Experiment, 64 normal persons were selected and divided into two groups at random, 32 for each group. One group of examinees watched the L-type sample machine and the other group watched the C-type sample machine. Statistically, there were no significant differences between the two groups in terms of gender or age. The statistical distribution graphs reflecting the blinking frequency change before and after the two groups of examinees watched TV are shown in FIGS. 13A and 13B, wherein FIG. 13A illustrates the blinking rate of those watching Sample Machine L and FIG. 13B illustrates the blinking frequency change of those watching Sample Machine C. The layouts of the two graphs are both normal in distribution, but their central values are significantly different from each other.

In Experiment, 64 n The average values of the blinking number for the two groups of examinees in each time section are shown in the following graph, and it can be seen that, the blinking frequency tended to increase in the course of watching the film. However, at the 60$^{th}$ min, the blinking frequency in each of the two groups is respectively lower than that of the same group before watching the film because the attraction of the film content reduced the examinees' blinking frequencies. However, as the time for watching the stony program extended, the examinees' corneas felt uncomfortable, such that their blinking frequencies gradually increased to exceed the level before watching the film.

The average values and standard deviations of the blinking frequency for the two groups of examinees recorded in each time section are listed in Table 2 below. Five average values of blinking frequency in each group were analyzed to compare them one by one (paired t test), so as to obtain the statistical analysis data, which is shown in the most right column of the table below. As shown by the statistical comparison of the blinking frequency before and after the film watching, the blinking frequency for the linearly-polarized examinees after the film watching was higher than that before watching, and the difference therebetween is significant (p<0.01); the difference between the blinking frequencies for the circularly-polarized examinees before and after the film watching is not so significant (p>0.05).

TABLE 2

Blinking frequency for two groups of examinees in each time section
(Average Value ± Standard Deviation, Number/200 s)

| Group | Before Watching | 60 min | 90 min | 120 min | After Watchin | Average value comparison within each group |
|---|---|---|---|---|---|---|
| Linearly Polarized | 45.3 ± 27 (a1) | 43.9 ± 32.3 (b1) | 48.1 ± 32.3 (c1) | 55.9 ± 31.3 (d1) | 55.2 ± 30.9 (e1) | a1~d1: p < 0.01<br>a1~e1: p <0.01<br>b1~c1: p < 0.05<br>b1~d1: p < 0.01<br>b1~e1: p < 0.01<br>c1~d1: p < 0.05<br>c1~e1: p < 0.05<br>others: p > 0.05 |

TABLE 2-continued

Blinking frequency for two groups of examinees in each time section
(Average Value ± Standard Deviation, Number/200 s)

| Group | Before Watching | 60 min | 90 min | 120 min | After Watching | Average value comparison within each group |
|---|---|---|---|---|---|---|
| Circularly Polarized | 44.3 ± 22.6 (a2) | 39.6 ± 23.6 (b2) | 40.7 ± 23.9 (c2) | 49.3 ± 27.6 (d2) | 44.5 ± 20.6 (e2) | b2~d2: p < 0.01<br>b2~e2: p < 0.05<br>c2~d2: p < 0.01<br>others: p > 0.05 |

The blinking of human beings mainly includes voluntary blinking, reflective blinking and spontaneous blinking. Conventionally, it is believed that spontaneous blinking aims at moisturizing and cleaning the eye balls, which occurs at a certain frequency to avoid dry eyes. Therefore, dry eye phenomenon may cause the increase of the blinking frequency. Nictitation diminution caused by concentration is only one of the reasons that cause VDT eye fatigue. During our research, watching linearly-polarized LCD-TV for a long time may cause a significant increase of the blinking frequency, whereas watching circularly-polarized LCD-TV for a long time does not cause such a significant change in the blinking frequency. This shows that the eye fatigue caused by the circularly-polarized LCD-TV is different from and less than that caused by the linearly-polarized LCD-TV.

Though the present invention has been disclosed above by the preferred embodiments, they are not intended to limit the present invention. Any modifications, equivalent replacements, and improvements without departing from the spirit and scope of the present invention should fall within the protecting range of the present invention.

What is claimed is:

1. A liquid crystal display (LCD) device having reduced eye fatigue for viewers viewing the device with natural vision, comprising:
a transmitting element having an outer surface for emitting substantially linearly polarized output light; and
a polarizer component receiving and converting linearly polarized light into light that is substantially circularly or elliptically polarized light for output to a viewer of the display to decrease eye fatigue thereof when viewed with natural vision,
wherein the polarizer component includes a λ/2 compensation film and a λ/4 compensation film, and the thicknesses of the λ/2 compensation film and the λ/4 compensation film are respectively 270 nm and 140 nm.

2. The LCD device as claimed in claim 1, wherein the polarizer component is a wavelength compensation film.

3. The LCD device as claimed in claim 2, wherein the wavelength compensation film has a retardation value of the wavelength compensation film is an odd multiple of ¼ wavelength.

4. The LCD device as claimed in claim 3, wherein the wavelength compensation film has an optical axis at an angle of 45° or 135° from a polarization direction of an output light of the transmitting element.

5. The LCD device as claimed in claim 2, wherein the wavelength compensation film is a composite film with a ¼ wavelength compensation.

6. The LCD device as claimed in claim 5, wherein the composite film comprises the λ/2 compensation film and the λ/4 compensation film arranged along the direction of the output light.

7. The LCD device as claimed in claim 6, wherein the wavelength λ is in a range from 380 nm to 760 nm.

8. The LCD device as claimed in claim 6, wherein a retardation optical axis of the λ/2 compensation film is at an angle of θ from the polarization direction of the output light, and a retardation optical axis of the λ/4 compensation film is at an angle of 2θ+45° or 2θ+135° from the polarization direction of the output light.

9. The LCD device as claimed in claim 8, wherein an included angle θ formed between the polarization direction of the output light and the retardation optical axis of the λ/2 compensation film is in a range from 0° to 90°.

10. The LCD device as claimed in claim 2, wherein the wavelength compensation film is adhered with an adhesive on the output light polarizer.

11. The LCD device as claimed in claim 2, further including a protective film adhered to the wavelength compensation film.

12. An optical component to be disposed on a liquid crystal display (LCD) device to change the polarization of output light emitted from the LCD device to reduce eye fatigue of a person viewing the device with natural vision, the optical component comprising:
a transparent substrate; and
a wavelength compensator on a surface of the substrate, wherein the wavelength compensator converts an output light of the LCD device from a substantially linearly polarized light into a substantially circularly or elliptically polarized light, thereby attenuating eye fatigue to viewers of images on the LCD with natural vision,
wherein the wavelength compensator includes a λ/2 compensation film and a λ/4 compensation film, and the thicknesses of the λ/2 compensation film and the λ/4 compensation film are respectively 270 nm and 140 nm.

13. The optical component as claimed in claim 12, wherein the wavelength compensator comprises a compensation film having a retardation value that is an odd multiple of ¼ wavelength.

14. The optical component as claimed in claim 13, wherein an optical axis of the wavelength compensator is at an angle of 45° or 135° from a polarization direction of the output light from the LCD.

15. The optical component as claimed in claim 12, wherein the wavelength compensator is a composite film with a λ/4 compensation function.

16. The optical component as claimed in claim 15, wherein the wavelength λ is in a range of 380 nm to 760 nm.

17. The optical component as claimed in claim 15, wherein the composite film consists of the λ/2 compensation film and the λ/4 compensation film arranged along an output light direction.

18. The optical component as claimed in claim 17, wherein a retardation optical axis of the λ/2 compensation film is at an angle of θ from the polarization direction of the output light, and a retardation optical axis of the λ/4 compensation film is at an angle of 2θ+45 degree or 2θ+135° from the polarization direction of the output or incident light.

19. The optical component as claimed in claim 17, wherein an included angle θ formed between the polarization direction of the output light and the retardation optical axis of the λ/2 compensation film is in a range of 0° to 90°.

20. The optical component as claimed in claim 12, wherein the wavelength compensator is covered by a transparent substrate.

21. The optical component as claimed in claim 12, wherein the wavelength compensator is covered by a protective film.

22. The optical component as claimed in claim 12, wherein the optical component is fixed on the LCD device with a clamp.

23. The optical component as claimed in claim 22, wherein the clamp has two clamping heads connected to each other via an elastic element.

* * * * *